United States Patent [19]
Tippmann

[11] Patent Number: 5,767,487
[45] Date of Patent: Jun. 16, 1998

[54] SUBATMOSPHERIC PRESSURE COOKING DEVICE

[76] Inventor: Eugene R. Tippmann, 251 Country Lake Dr., Lexington, S.C. 29072

[21] Appl. No.: 732,105

[22] Filed: Oct. 15, 1996

Related U.S. Application Data

[60] Continuation of Ser. No. 487,906, Jun. 7, 1995, abandoned, which is a division of Ser. No. 252,651, Jun. 1, 1994, abandoned, which is a continuation-in-part of Ser. No. 99,418, Jul. 30, 1993, abandoned, which is a continuation-in-part of Ser. No. 852,785, Mar. 17, 1992, Pat. No. 5,235,903.

[51] Int. Cl.⁶ .................. F24C 1/14; H05B 6/64
[52] U.S. Cl. .............. 219/440; 219/686; 219/682; 219/771; 426/241; 99/451; 99/472
[58] Field of Search ........................ 219/686, 681, 219/682, 685, 700, 754, 771, 440, 431; 426/241, 242, 243, 244; 919/467, 470, 472, 474, 477, 478, 479, 358, 451, DIG. 14

[56] References Cited

U.S. PATENT DOCUMENTS

| | | |
|---|---|---|
| 3,223,021 | 12/1965 | Osswald . |
| 3,718,082 | 2/1973 | Lipoma . |
| 3,769,902 | 11/1973 | Hurwitz . |
| 3,800,778 | 4/1974 | Lohr et al. . |
| 4,011,805 | 3/1977 | Vegh et al. . |
| 4,034,119 | 7/1977 | Kanbe et al. ............. 426/497 |
| 4,115,596 | 9/1978 | Knutrud ................. 426/497 |
| 4,173,215 | 11/1979 | Bureau et al. . |
| 4,286,133 | 8/1981 | Einset et al. ............. 219/753 |
| 4,315,950 | 2/1982 | Reed . |
| 4,416,908 | 11/1983 | McKinney et al. . |
| 4,455,924 | 6/1984 | Wenzel . |
| 4,554,440 | 11/1985 | Lee, Jr. . |
| 4,623,780 | 11/1986 | Shelton . |
| 4,641,630 | 2/1987 | Meister . |
| 4,700,685 | 10/1987 | Miller . |
| 4,737,373 | 4/1988 | Forney . |
| 4,793,324 | 12/1988 | Caferro . |
| 4,796,776 | 1/1989 | Delquist et al. . |
| 4,803,919 | 2/1989 | Fritsch et al. ............. 49/472 |
| 4,884,553 | 12/1989 | Schwarzbacker . |
| 4,920,948 | 5/1990 | Koether et al. . |
| 5,048,400 | 9/1991 | Ueda et al. . |
| 5,048,403 | 9/1991 | Haas, Sr. et al. . |
| 5,088,293 | 2/1992 | Itou . |
| 5,142,970 | 9/1992 | ErkenBrack . |
| 5,168,797 | 12/1992 | Wang . |
| 5,235,903 | 8/1993 | Tippmann . |
| 5,334,402 | 8/1994 | Ovadia . |

FOREIGN PATENT DOCUMENTS

| | | |
|---|---|---|
| 0379283 | 1/1990 | European Pat. Off. . |
| 0586035 | 3/1993 | European Pat. Off. . |
| 2462103 | 2/1981 | France . |
| 2625891 | 7/1989 | France . |
| 2635167 | 2/1990 | France . |
| 1269313 | 9/1954 | Germany . |
| 9007085 | 10/1991 | Germany . |
| 53-64840 | 6/1978 | Japan ................. 219/686 |
| 62-280519 | 12/1987 | Japan . |
| 63-180019 | 7/1988 | Japan ................. 219/686 |
| 63-311026 | 12/1988 | Japan . |
| 3-247921 | 11/1991 | Japan ................. 219/686 |
| 443225 | 2/1992 | Japan . |
| 4347418 | 12/1992 | Japan . |
| 2132745 | 12/1983 | United Kingdom . |

*Primary Examiner*—Philip H. Leung
*Attorney, Agent, or Firm*—Sixbey, Friedman, Leedom & Ferguson, P.C.; Gerald J. Ferguson, Jr.; Donald R. Studebaker

[57] ABSTRACT

A method of preparing a food product is disclosed and includes the steps of placing the food product within a cooking cavity, reducing the pressure within the cooking cavity thereby creating a vacuum within the cooking cavity, heating the food product within the cooking cavity and returning the cooking cavity to atmospheric pressure. In doing so, a temperature necessary to cook the food product in the vacuum is less than that temperature necessary to cook the food product at atmospheric pressure. Consequently, the food product may be fully cooked at a temperature which does not cause the food product to dry-out or become tough.

9 Claims, 8 Drawing Sheets

SUBATMOSPHERIC PRESSURE COOKING DEVICE

This application is a Continuation of Ser. No. 08/487,906, filed Jun. 7, 1995, now abandoned which is a divisional application of Ser. No. 08/252,651, filed Jun. 1, 1994 now abandoned which is a continuation-in-part application of Ser. No. 08/099,418 filed Jul. 30, 1993, now abandoned which is a continuation-in-part application of Ser. No. 07/852,785, filed Mar. 17, 1992, now issued U.S. Pat. No. 5,235,903.

BACKGROUND OF THE INVENTION

The present invention relates generally to cooking ovens and more particularly to such an oven which cooks utilizing a variety of heating mediums. Preferably, the cooking is carried out at a reduced pressure and the oven is adapted to hold the cooked product at a preferred temperature in a reduced atmosphere during the cooking.

There are a wide variety of known cooking techniques and there has been, within each, a great deal of experimentation with the several variables associated with such cooking techniques. For example, the use of steam as a heat transfer medium is well known. Such steam cooking devices may employ the steam at atmospheric pressure as in U.S. Pat. No. 4,011,805 with convection heat transfer. Steam as the heat transfer medium at substantially atmospheric pressure with forced convection heat transfer is also known from U.S. Pat. No. 4,173,215. In this last patented arrangement, water is introduced into the bottom of a steam chamber and a heat source outside that chamber heats that water to produce steam. The chamber is vented so as to maintain the pressure within the cooking vessel at substantially atmospheric pressure. Such steam cooking devices may employ the steam at an elevated pressure as in the common "pressure cooker". U.S. Pat. No. 3,800,778 discloses a steam cooker with a valve and pump arrangement so that the pressure within the cooking vessel can be maintained either above or below atmospheric pressure.

The stated reason for cooking below atmospheric pressure is to cook at a reduced temperature so that delicate foods will not be overcooked and their vitamins lost. U.S. Pat. No. 3,223,021 employs this same general concept in a coffee roasting oven which operates below atmospheric pressure for a period of time and then has its internal pressure increased. The coffee in this roasting oven is cooled after roasting and before the pressure is released. Finally, the concept of a food holding cabinet is old and disclosed, for example, in U.S. Pat. No. 4,623,780. This patent points out that it is difficult to maintain precooked food at a preferred serving temperature while maintaining its moisture content. The patent suggests food storage at a temperature below its cooking temperature and in a steam atmosphere to maintain crust crispness, for example, with fried chicken, while minimizing moisture loss.

There has been a significant amount of research into eating habits as they relate to health. For example, in the article PREVENTION OF FORMATION OF IMPORTANT MUTAGENS/CARCINOGENS IN THE HUMAN FOOD CHAIN by Weisburger and Jones, it is pointed out that during cooking (typically frying or broiling) leading to the browning of meat or fish, mutagens or carcinogens are frequently generated. The article suggests the desirability of finding ways to lower or prevent the formation of these undesirable products during cooking. One scheme for lowering these undesirable products is to reduce the surface temperature during cooking. Another is by additives to the meat or fish prior to cooking.

From the above article, it appears that the undesirable mutagens or carcinogens are generated on the food surface during cooking, for example, of a hamburger on a conventional hot grill and that these undesirable products will be scraped off the grill with the meat and placed in the consumer's sandwich.

The current method of cooking a hamburger, for example, requires a lot of fat for three reasons. The fat acts as a release agent preventing the meat from sticking to the griddle. It also acts as a heat transfer medium. Finally the fat provides the "juiciness" in the finished sandwich. The undesirability of the conventional "fast food" approach to cooking beef for sandwiches on a hot grill should now be apparent.

Lower cooking temperatures not only reduce or eliminate the formation of the above noted mutagens or carcinogens, but also provides a more palatable product. Exposing meat to high temperatures causes the fibers in the meat to shrink purging the meat of its natural juices. Such high temperature cooking also cooks the outer surface to its "done" state prior to the interior reaching that "done" condition. Thus, the outer portions are frequently comparatively over-cooked, dry and tough. Reduced cooking temperatures ensure that the food product will not be over-cooked regardless of the time the food product is subjected to that reduced temperature and that the center as well as the surface will be cooked to perfection.

It is a well known phenomenon that it seems to take forever to hard boil an egg at high elevations, say, for example, high in the mountains, where the air pressure is significantly lower than it is at sea level. The reason is that the water in which the egg is immersed boils at a much lower temperature under the reduced pressure conditions and the egg never gets as hot as it will under similar circumstances at sea level. The present invention capitalizes on this phenomenon by reducing the pressure within the cooking vessel during cooking. Researchers have identified at least four compounds in cooked meats that are known carcinogens that are formed during conventional cooking. These compounds, known as heterocyclic aromatic amines, or HAAs, are formed by the heating of animal protein. These compounds are formed as a normal part of the cooking process, whether the meat is beef, pork, chicken, or fish. This invention provides a method to solve this problem. It will eliminate the carcinogens that are formed during cooking and reduce fat by as much as 66% in such products as hamburgers. This invention provides a new method of cooking which improves the taste and nutritional value of meat and vegetables.

SUMMARY OF THE INVENTION

It is a primary object of the present invention to overcome the shortcomings of the prior art discussed hereinabove.

A further and significant object of the present invention is to provide a cooking device and method for cooking a food product, particularly a meat product while eliminating cancer causing compounds which are formed using presently known cooking methods and devices.

Another object of the present invention is to provide a cooking method and cooking device for reducing the fat content of meat products when such products are cooked while improving the overall yield of the food product.

It is yet a further object of the present invention to improve the tenderness and flavor of the food product by retaining more of the natural juices within the food product.

Among the several objects of the present invention may be noted the provision of a cooking technique which provides a moist food product, such as meat, without the fat normally present in such moist food products; the provision of an oven capable of cooking the product at a preferred temperature without dehydrating that cooked product; and the reduction or avoidance of the carcinogens and mutagens frequently associated with the cooking of meat on a grill. These as well as other objects and advantageous features of the present invention will become apparent from the following detailed description.

In accordance with a first embodiment of the present invention, a method of preparing a food product includes the reduction of the ambient pressure surrounding the food product while in one embodiment allowing steam to surround the food product for a predetermined period of time to cook the food product. Thereafter, air is allowed to enter the cavity or chamber in which the food product is located and the food product is maintained at a preferred holding temperature without further cooking. With this process, the effective heat transfer rate to the food product is substantially greater during the time period of reduced pressure and is significantly reduced when the air enters the cavity. Reentry of air is typically associated with a restoration to atmospheric pressure. Preferably, to generate the steam, water is boiled in the range of one-hundred sixty to one hundred seventy degrees fahrenheit in the reduced ambient pressure.

In one form of the invention, a cooking and holding food preparation unit or oven has a food receiving compartment and a door with an interposed gasket for hermetically sealing the compartment when the door is closed. A liquid receiving open-topped tray is located near the bottom of the compartment. The compartment itself may function as the tray. The liquid, typically simple tap water, in the tray is heated by electrical resistance strip heating elements beneath the compartment which are under the control of a thermostat coupled to the tray and to the heating elements so as to maintain the temperature of the tray at an operator selected temperature. The air pressure within the compartment is maintained at a subatmospheric level by a vacuum pump while food is being cooked.

A vacuum release valve selectively couples the compartment to the exterior atmosphere and there may be a timer for measuring elapsed time after cooking is begun which opens the vacuum release valve upon the expiration of an operator determined cooking time interval. While the liquid may be simple tap water, aromatic materials may be added to give the food a particular flavor. A "smoked" flavor could, for example, be easily provided in this way.

In a preferred embodiment of the present invention, a method of preparing a food product comprises the steps of placing the food product within a cooking chamber, reducing the pressure within the cooking chamber thereby creating a vacuum within the cooking chamber, heating the food product within the cooking chamber and returning the cooking chamber to atmospheric pressure. In doing so, a temperature necessary to cook the food product in the vacuum is less than that temperature necessary to cook the food product at atmospheric pressure. Consequently, the food product may be fully cooked at a temperature which does not cause the food product to dry-out or become tough. This can be accomplished in several manners, the first being by way of an oven for cooking the food product comprising a cooking cavity for accommodating the food product, a vacuum pump communicating with the cooking chamber for reducing the ambient pressure within the cooking cavity, a heating device for heating the food product in a reduced atmosphere and selectively restoring the cooking cavity to atmospheric pressure once the cooking of the food product is completed. In one embodiment the heating device includes a megnatron unit for generating microwave energy and directing the microwave energy to the cooking cavity. While in another embodiment the heating device generates an electric current and directs the electric current to the cooking cavity and through the food product. The electric current is passed through the food product by supporting the food product by at least one lower conductive element and contacting an upper surface of the food product with at least one upper conductive element, such that the electric current passes from the upper conductive element through the food product and to the lower conductive element.

Additionally, the food product can be placed in a standard baking oven wherein the internal pressure of the oven is reduced. Reducing the internal pressure of a standard baking oven whether such oven be of the radiant, rotisserie or convection type dramatically improves the quality of the food product being cooked.

These as well as additional objects and advantages of the present invention will become apparent from the following detailed description when read in light of the several figures.

BRIEF DESCRIPTION OF THE DRAWINGS

Corresponding reference characters indicate corresponding parts throughout the several figures.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
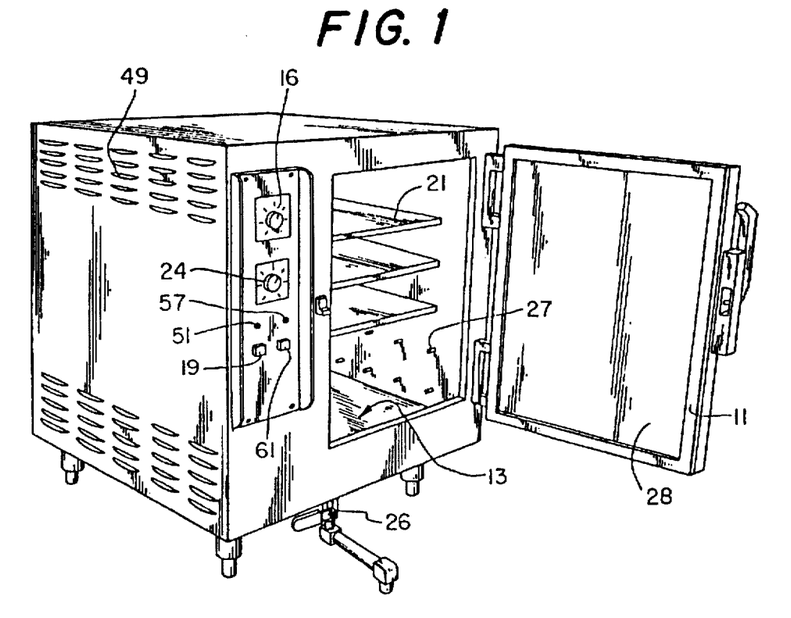
FIG. 1 is a perspective view of a single compartment steam cooking and holding oven in accordance with a first embodiment of the present invention.
Figure 2:
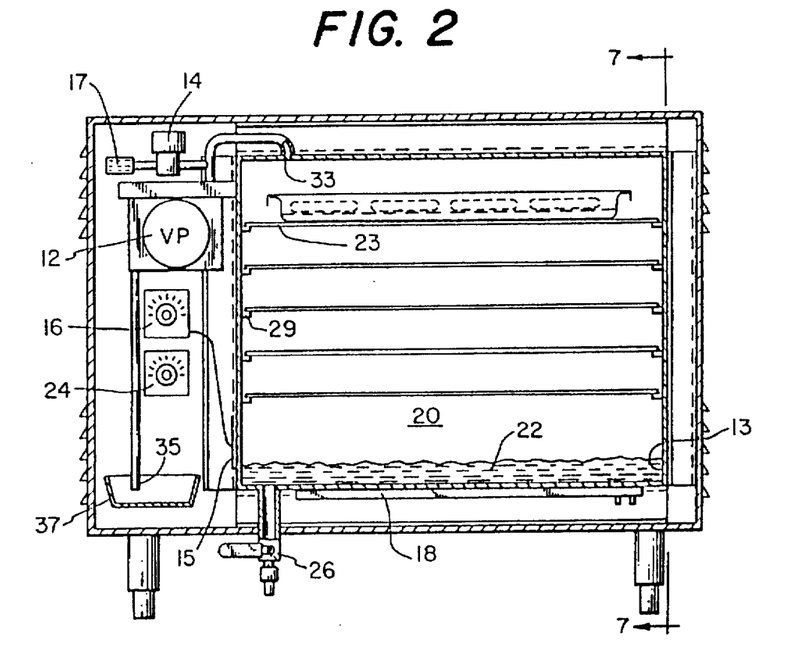
FIG. 2 is a front view of the oven of FIG. 1 with the front panel thereof removed.
Figure 7:
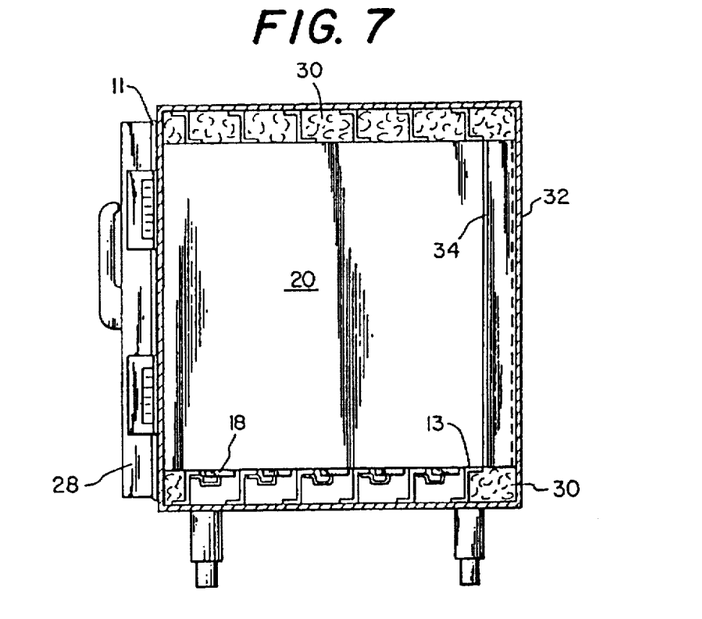
FIG. 7 is a view in cross-section along line 7—7 of FIG. 2 having the shelves removed.
Figure 8:
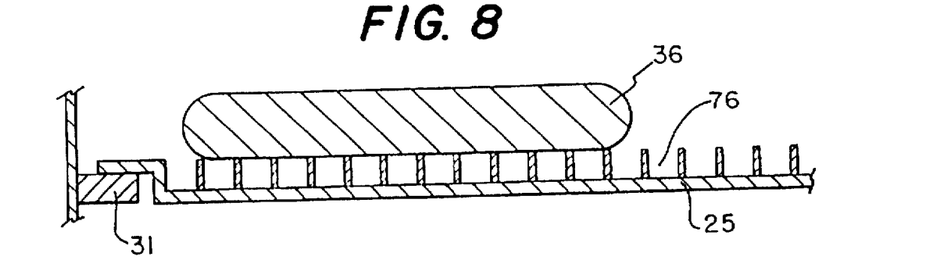
FIG. 8 is a view in cross-section along line 8—8 of FIG. 9 and showing a food product supported on a portion of a rack or shelf.

A cooking and holding food preparation unit or oven is shown in FIGS. 1, 2 and 7 and includes a food receiving compartment 20. The compartment includes a door 28 and a gasket 11 for hermetically sealing the compartment when the door is closed. There is a liquid receiving open-topped tray in the form of the sealed bottom compartment region 13 near the bottom of the compartment. This tray holds about two gallons of water 22. Water 22 is heated by strip resistance heating elements 18. The temperature of the compartment is sensed by probe 15 of thermostat 16 the setting of which controls energization of the heating elements 18 thereby maintaining the temperature of the compartment at an operator selected temperature. A vacuum pump 12 is provided for selectively removing air and reducing the pressure within the compartment 20 and a vacuum release valve 14 selectively couples the compartment 20 to the exterior atmosphere at outlet 17. A timer 24 measures elapsed time after cooking is begun and functions to open the vacuum release valve 14 upon the expiration of an operator designated time interval.

There is a start control 19 which, when depressed, initiates operation of both the thermostatic control of the heating elements 18 and the timer 24. Once started, the thermostatic control and timer operate independently of one another and, typically, operation of the heating elements 18 continues long after the opening of the vacuum release valve 14. Tray 13 may be filled and emptied daily and a manually operable drain valve 26 has been provided near the lowermost portion of the tray to facilitate nightly draining thereof. There are a plurality of food receiving racks such as 21, 23 and 25 (FIGS. 1, 2, 8 and 9 respectively) supported in stacked relationship within the compartment 20 by sidewall pins such as 27, 29 and 31. There is also an optional grease catching pan 40 in FIG. 3 and 38 in FIG. 9 which is interposed between the lowermost of the racks and the water evaporation tray 13. The pump 12 has an inlet 33 located near the top of the compartment 20 and an outlet 35 which terminates immediately above a moisture collection pan 37. Little moisture is collected by this pan and, like the tray in an automatic defrost refrigerator, evaporation is adequate to keep it from overflowing. A heating element 39 (FIG. 10) may be provided beneath tray 37 to aid evaporation if desired.

Figure 10:
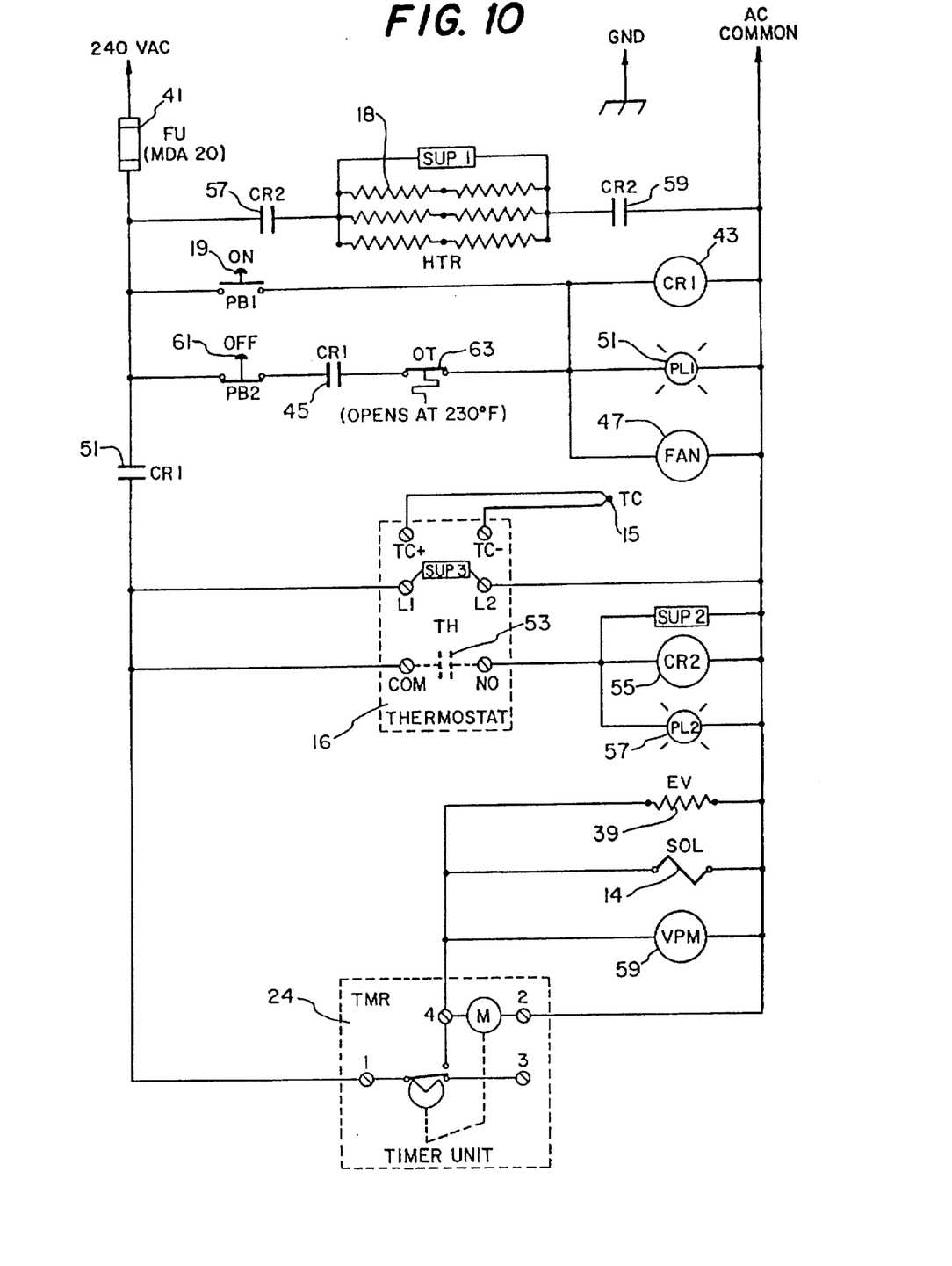
FIG. 10 is an electrical schematic diagram of a control circuit suitable for the practice of the present invention.

Many of the components of FIG. 10 have already been discussed. A main fuse 41 is placed in the hot line. When the operator depresses the ON button 19, control relay number one is latched with its coil continuously energized by way of its now closed contacts 45. A fan 47 which circulates cooling air through the louvers such as 49 and between the oven walls is similarly continuously energized as is the ON indicator light 51. A second set of normally open contacts 51 close when coil 43 is energized supplying electrical energy to the thermostat 16. As long as the thermostat 16 contacts 53 are closed indicating a below desired temperature condition, coil 55 of a second control relay is enabled. This second control relay has two sets of normally open contacts 57 and 59 which close to energize the heating elements such as 18. When coil 55 is on, a heaters ON lamp 57 is also energized. When timer 24 is active, solenoid coil 14 is enabled and the vent closed off. At the same time the motor 59 which drives the vacuum pump 12 is enabled to reduce the interior vessel pressure. When the timer times out, the pump motor 59 and solenoid 14 are disabled opening the vent 17 and returning interior pressure to atmospheric. Heaters 18 remain ON. To shut off the oven, OFF button 61 is momentarily depressed disabling coil 43 and causing contacts 51 to reopen. An oven temperature sensor 63 may effect this same turn off if the oven temperature exceeds, say, 230 degrees fahrenheit.

In one embodiment, a double wall construction was utilized with about two inches of insulation 30 between the cooking compartment 20 and certain ones of the exterior walls. Typically, the door 28 and top are insulated. Other exterior walls such as 32 were spaced from the interior walls such as 34 and air allowed to circulate between the walls to maintain the outer walls at a safe temperature. Typically, 14 gauge stainless steel interior walls such as 34 and 20 gauge stainless steel exterior walls were utilized except for the door 28 which utilized 20 gauge stainless steel for both its inner and outer wall panels.

The cooking and holding food preparation unit as described has a single compartment, but two compartment models are also contemplated with each compartment substantially as described and operable independently of the other. The cooking and holding food preparation unit is particularly suited to use in schools, hospitals and similar institutional environments as well as restaurants and other commercial operations.

The method of operation of the above described device should now be clear. During the cooking cycle, the vacuum pump 12 is on, the solenoid valve 14 is closed and the thermostat 16 is controlling the strip heaters 18. The vacuum pump removes air from the compartment 20 reducing the pressure therein and causing the water 22 to boil at a temperature well below the normal 212 degree fahrenheit boiling point. The thermostat 16 setting determines the temperature of the water 22 and steam within the compartment 20. Steam condenses on the surface of food products (or their containers) within the compartment adding heat thereto. This cook cycle continues until the timer 24 times out and converts the oven to its hold mode of operation.

During the hold cycle or mode, the vacuum pump 12 is off, the solenoid valve 14 is open and the thermostat 16 continues to control the heaters 18. All the heat comes through the water 12 causing the relative humidity within the compartment 20 to be at 100%. Because of this 100% relative humidity, no moisture evaporates from the food product during this hold mode.

Figure 3:
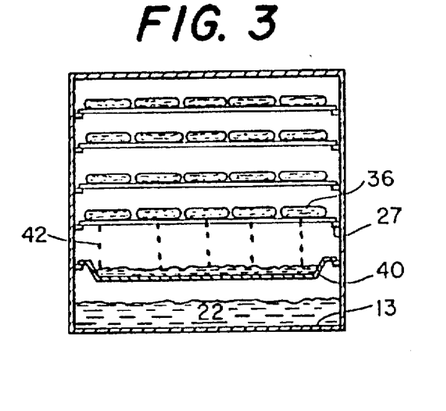
FIG. 3 is a front view in cross-section of the oven cavity portion thereof illustrating one cooking mode.
Figure 4:
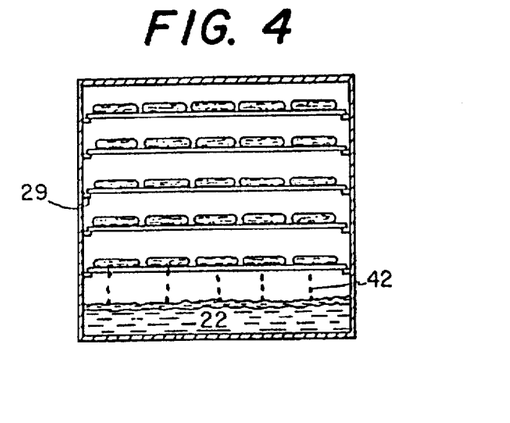
FIG. 4 is a front view in cross-section of the oven cavity portion thereof illustrating another cooking mode.
Figure 5:
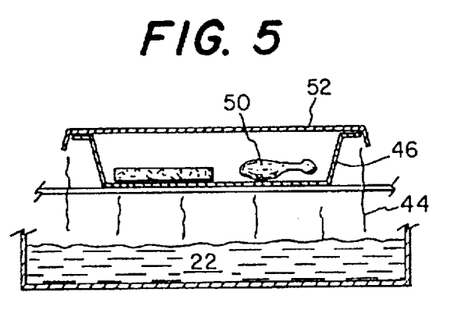
FIG. 5 is a front view in cross-section of the lower part of the oven cavity portion thereof illustrating a "dry" cooking mode.
Figure 6:
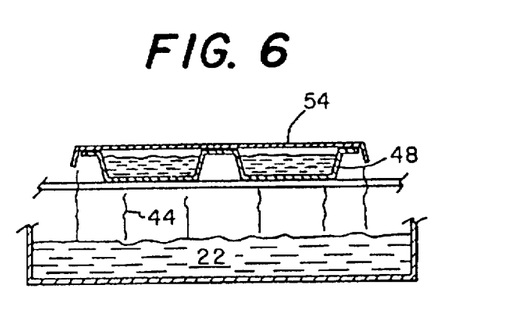
FIG. 6 is a front view in cross-section of the lower part of the oven cavity portion thereof illustrating yet another cooking mode.

FIGS. 3, 4, 8 and 9 generally illustrate the "lean" cooking of meat with fat dripping away therefrom as at 42 while FIGS. 5 and 6 illustrate that "crispy" food products may be cooked in the unit without the direct application of the steam 44 thereto by enclosing them in a covered non-hermetic vessel 46 so that heat transfer is from the steam to the vessel and then from the vessel by a combination of conduction and convection to the food product so that the food product is protected from becoming too moist from direct exposure to the steam.

It should be noted that lids 52 and 54 in FIGS. 5 and 6 extend beyond and below the edges of their respective vessels. Since steam is heavier than air, an air lock or trap is formed by the air within the underside of the lid effectively preventing steam from entering and condensing on the food products. As a specific illustration of the operation of the oven and of the unique cooling method herein in accordance with a first embodiment of the present invention, a hamburger 36 may be cooked in about 20 minutes in one-hundred sixty five degree fahrenheit steam. As the steam adds heat to the hamburger, the fat melts and drains into the catch pan 38 (FIG. 9) or 40 (FIG. 3).

The juice that is purged from the meat which carries creatinine, drains into the catch pan and the fat and juice are never consumed. In some cases, the juice may simply be allowed to drain back into the water supply 22 as shown in FIG. 4. In either case, no mutagens or carcinogens are formed on the meat because the juice carrying the creatinine runs off and because the meat is never exposed to any high temperatures. The one hundred sixty five degree temperature is not sufficiently high to form the earlier discussed mutagens and carcinogens. The hamburger may be subsequently held ready to be served for up to several hours if desired. This sequence of events is illustrated generally in FIG. 11.

Figure 9:
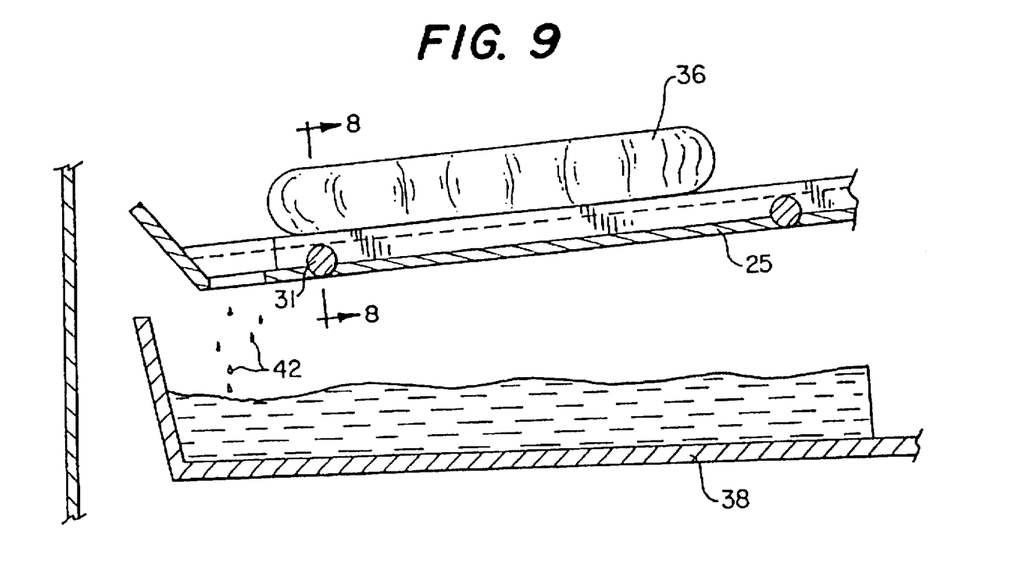
FIG. 9 is a view in cross-section of the rack and food product of FIG. 8 superposed over a grease collecting pan.
Figure 11:
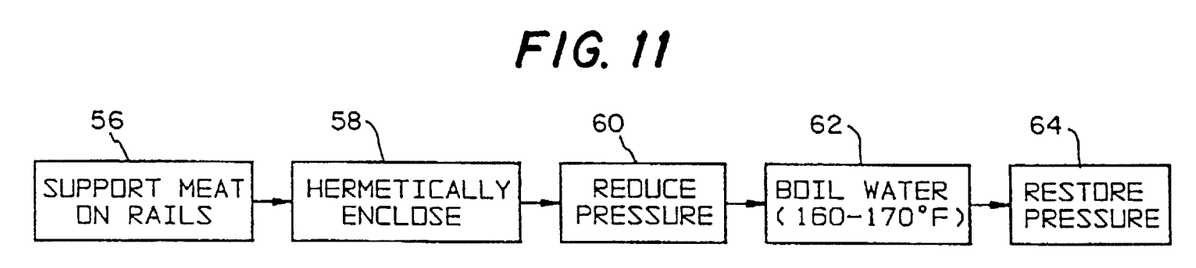
FIG. 11 is a flow chart illustrating one unique cooking technique utilizing the oven of FIG. 1.

In FIG. 11, a food product such as a hamburger (actually beef) patty is cooked in a way to significantly reduce the usual heat induced shrinkage by initially supporting 56 that beef patty on a plurality of relatively thin rails such as the extruded aluminum grill or rack 25 of FIG. 9 so that there are the spaces such as 76 between the rails through which the fat may drain. The thus supported patty is hermetically enclosed 58 within the oven cavity and the pressure therein reduced as indicated at 60. Steam generated at 62 by water boiling within the hermetic enclosure at, for example, 160 to 170 degrees fahrenheit surrounds the patty transferring heat thereto. At the desired time, the pressure is reduced at 64 and the cooked patty held at a preferred temperature and without significant moisture loss awaiting consumption.

Figure 12:
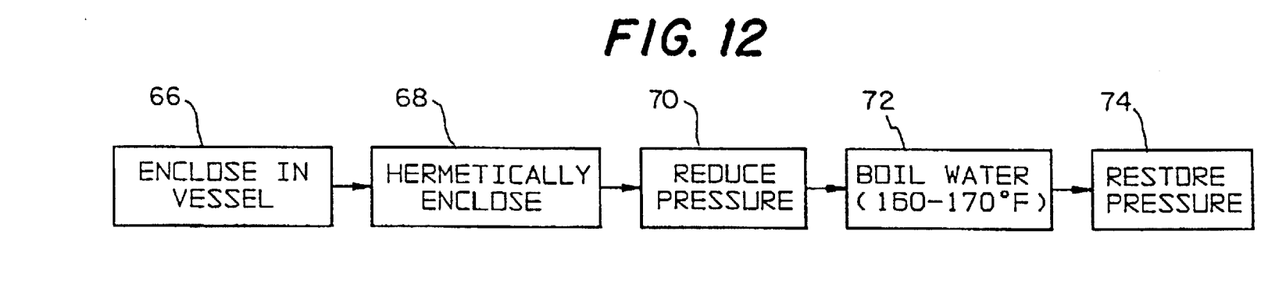
FIG. 12 is a flow chart illustrating another unique cooking technique utilizing the oven of FIG. 1.

As a second specific illustration, consider FIGS. 5 and 6 in conjunction with the cooking process illustrated in FIG. 12. A food product such as fried chicken 50 having a surface which should be kept "crispy" is enclosed in a vessel 46 having cover 52. The vessel or tray 46 along with its cover 52 form a non-hermetic vessel in which the food is enclosed as indicated by 66 in FIG. 12. Thereafter, the vessel is hermetically enclosed (68) and the ambient pressure surrounding the vessel is reduced as at 70. Steam generated at 72 is allowed to surround the covered vessel 46 or 52 for a predetermined period of time to cook the food product therein by the transfer of heat from the steam to the vessel (including to the lids 52 or 54) and then from the vessel to the food product by a combination of conduction and convection so that the food product is protected from becoming too moist from direct exposure to the steam. Finally, the ambient pressure surrounding the vessel is restored as at 74, to atmospheric pressure and the food product is maintained at a preferred temperature without further cooking and without the direct application of the steam to that food product. In FIGS. 5 and 6, the vessel covers 50 or 52 fit over the tray 46 or 48 forming an air lock to transmit the pressure changes within the oven cavity to the interior of the vessel while substantially excluding moisture condensate therefrom. In each case, the steam completely surrounds the vessel transferring heat to all sides thereof. The primary difference between the cooking technique of FIG. 5 and that of FIG. 6 is that the sidewalls of the container or vessel 48 are in direct heat conducting contact with the food product therein, e.g., a vegetable or pudding, while the food product in FIG. 5, e.g., a chicken leg 50, rests on the tray floor receiving heat by conduction therefrom, but is otherwise heated by convection within the vessel.

In summary, the first embodiment of the present invention has a number of advantages over known prior devices. Operation is simple, just set the time and temperature and when the time has elapsed, the oven automatically goes into its hold cycle. There is no need to transfer food from a cooking oven to a holding oven. The 100% relative humidity during the hold cycle assures that the food product will not dry out. There is no boiler. About two gallons of water are poured into the oven at the beginning of the day and at days end, valve 26 is opened and the water drained. While there may be a drain hookup if desired, the two gallons or less of water remaining in the oven at days end may simply be drained into a pan or bucket. With no drain hookup, the oven is easily moved and located in the most convenient position in a kitchen or cafeteria. Daily draining and refilling helps prevent the buildup of lime or other minerals within the oven. The reduced pressure within the cooking cavity prevents the door 28 from being opened during the cooking cycle. During the hold cycle, the door may be opened safely and without danger of scalding since only high humidity hot air is within the oven. Finally, the elimination of any drying of the food during the hold cycle enhances yield and reduces food costs.

Figure 13:
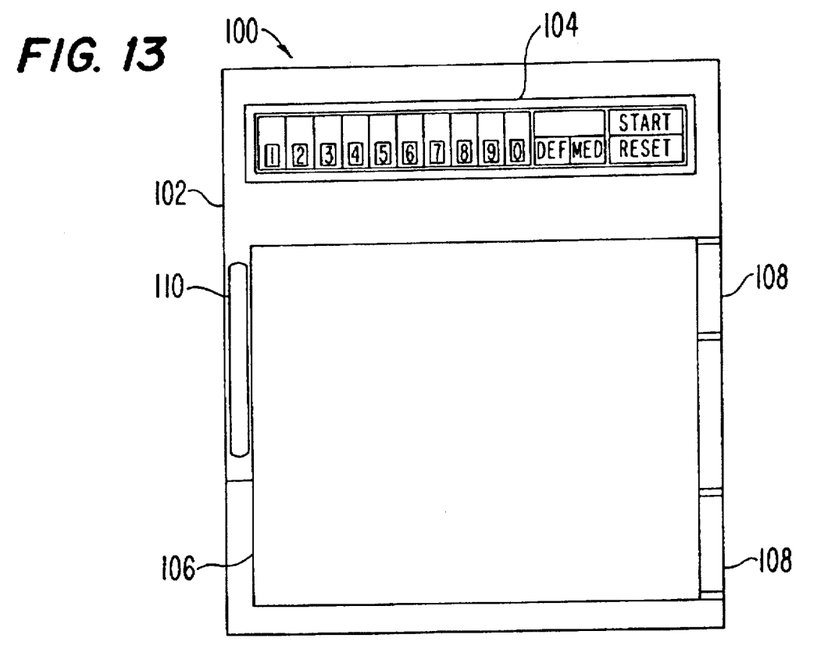
FIG. 13 is an elevational view of a cooking device for reduced pressure microwave cooking in accordance with an alternative and preferred embodiment of the present invention.
Figure 14:
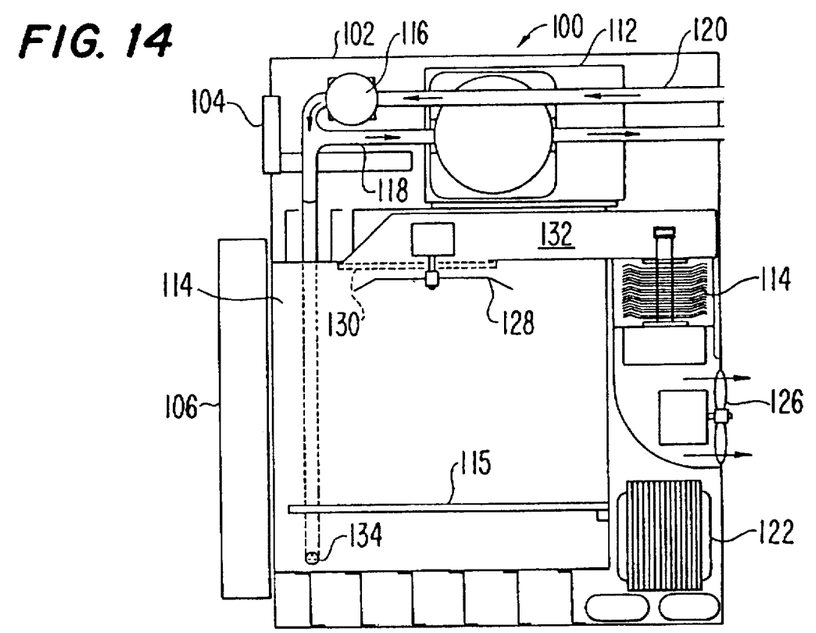
FIG. 14 is a cross-sectional view of the cooking device illustrated in FIG. 13.
Figure 15:
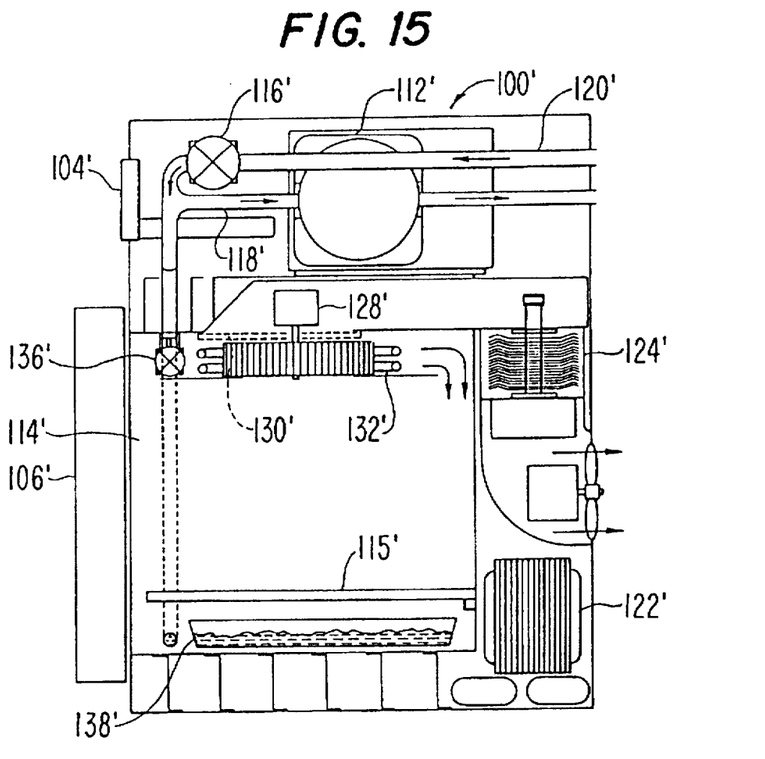
FIG. 15 is a cross-sectional view of a modified cooking device illustrated in FIG. 13.

Referring now to FIGS. 13–15, an alternative and preferable embodiment of the present invention will be discussed in greater detail. As discussed hereinabove, a reduction in the internal pressure within a cooking device has a dramatic effect on how the food cooks within the device. This is particularly true when cooking meat products.

The cooking device illustrated in FIG. 13 is an industrial type microwave oven 100 or any type oven which cooks with electrical wave form energy such as microwaves, radio waves and the like, which includes a housing 102 accommodating a control panel 104 and having a door 106 hingedly connected thereto by hinges 108. A handle 110 is provided for opening and closing the microwave oven and for permitting access to the contents of the microwave oven by the consumer. Unlike a conventional microwave oven, the oven illustrated in FIGS. 13 and 14 includes a vacuum pump 112 for evacuating the cavity or cooking chamber 114 within an interior of the microwave oven. Also provided is a solenoid valve 116 which permits a vacuum to be drawn within the cavity 114 and selectively subjecting the cavity 114 to atmospheric pressure through the solenoid valve 116. As is readily apparent from FIG. 14, the vacuum pump 112 includes a vacuum line 118 which extends to a lower region of the cavity 114. The significance of the vacuum line extending to the lower region of the cavity 114 will be explained in detail hereinbelow. Also connected to the solenoid valve 116 is an atmospheric pressure passage 120.

As with conventional microwave ovens, the microwave oven 100 includes a transformer 122 and megnatron tube 124. A cooling fan 126 is also provided for cooling the megnatron tube 124 as with conventional microwave ovens. Therein, microwaves generated by the megnatron tube 124 are dispersed throughout the cavity 114 of the microwave oven by the microwave mixer 128. A glass barrier 130 is also provided which permits the microwaves to pass therethrough while protecting the megnatron tube 124 from any moisture or steam which may be generated within the cavity 114 of the microwave oven.

FIG. 15 illustrates an alternative embodiment of the microwave oven set forth in FIG. 14. Therein, the microwave oven 100' includes the door 106' which closes the cavity 114' of the microwave oven. As with the previous embodiment, a vacuum pump 112' is provided for evacuating the cavity 114' of the microwave oven. Likewise, a solenoid valve 116' is provided for selectively exposing the cavity 114' to atmospheric pressure by way of the passage 120'. During the evacuation of the cavity 114', a vacuum is drawn by the vacuum pump 112' through the vacuum passage 118' as with the previous embodiment. Unlike the previous embodiment; however, the evacuation of the cavity 114' is conducted through a top portion thereof rather than a bottom portion as with the previous embodiment. The significance of which will be explained in greater detail hereinbelow.

Further, as with the previous embodiment as well as conventional microwave ovens, a transformer 122' is provide along with a megnatron tube 124' for generating the microwave energy for heating the contents of the cavity 114'. Also as with the previous embodiment, a microwave mixer 128' is provided for dispersing the microwaves throughout the cavity 114' with the glass barrier 130' being provided to protect the megnatron tube 124'. Unlike the previous embodiment, a resistance heater 132' is provided in an upper portion of the cavity 114' for preheating the walls of the cavity 114'. That is, the cooking compartment is preheated to approximately 250° Fahrenheit using the resistance heater 132'.

Like the previous embodiment, reducing the internal pressure of the oven lowers the boiling point of the moisture in the food product being cooked. When the microwaves pass through the food product, the energy is transformed into heat, the heat is generated in small areas within the food product and subsequently dissipated throughout the food product. As discussed hereinabove, the problem with using microwave ovens to heat and cook a food product is that the heat generated within the food product is too hot and overcooks the product in very small areas, such that the meat becomes tough in those areas. It can be noted that as long as there is moisture in the food product, the maximum temperature of the food product can get to is the boiling temperature of the moisture in the food product which is 212° Fahrenheit. Reducing the pressure within the cavity 114 or 114' thus reduces the boiling temperature of the moisture in the meat and eliminates the overcooking which causes the meat to become tough. The ideal temperature for cooking beef is approximately 155° Fahrenheit while the ideal temperature for chicken and pork is approximately 170° Fahrenheit. Consequently it is desirable to maintain the cooking temperature within the cavity 114 or 114' in the range of 150° to 180° Fahrenheit. This can be accomplished by controlling the pressure within the oven.

Reducing the internal pressure by way of the vacuum pump 112 or 112' in the preceding embodiments also removes the air from the cavities 114 and 114' thus the cavities become filled with saturated steam. Saturated steam is steam that is at its condensing temperature. When the cavity 114' is filled with saturated steam, all internal surface temperatures are equal to or above the condensing temperature of the saturated steam. In order for there to be a surface temperature lower than the condensing temperature of the steam, there would have to be a pressure difference within the cavity 114'. Because all surface temperatures are the same or greater, the possibility of one piece of meat within the cavity being done before another is eliminated because the moisture on the warmer piece of meat would boil and absorb heat and then transfer such heat in the form of steam and condense on a cooler piece of food within the cavity 114' and subsequently dissipating such heat to the cooler piece.

Referring again to FIG. 14, during the cooking cycle, the vacuum pump 112 is turned on and the solenoid valve 116 is closed. With a food product, such as a hamburger or other product containing moisture placed in the cavity 114, the megnatron tube 124 is activated so as to generate microwave energy which travels through the tunnel 132 and is reflected down into the cavity 114. The food product may be placed on a rack 115 or on a separate support within the cavity 114. A microwave energy passes through the glass barrier 130 and is mixed throughout the cavity 114 by the microwave mixer 128. The microwaves are permitted to bounce around within the cavity 114 until they are absorbed by the food being cooked and subsequently changed into heat. Removing air and steam from the bottom of the cavity 114 by way of the port 134 causes the cooking compartment to be filled with low pressure air. When the microwaves heat the food to the point where the moisture in the product boils, the steam rolls off the product and is evacuated from the bottom of the cooking compartment 114 by the vacuum pump 112. Because the heat transfer medium is the food product itself, an abundance of steam is undesirable. Consequently, because steam is heavier than the air within the cooking compartment, the steam is easily removed from the lower part of the compartment. Thus by withdrawing steam from the bottom of the cavity 114, any condensation on the walls of the cavity 114 or the food product can be avoided. Accordingly, by reducing the pressure within the cavity 114, the temperature at which the food item and particularly meat is cooked within the cavity 114 is reduced to a point where the product is cooked without achieving a temperature which creates carcinogens.

With respect to FIG. 15, when cooking a product within this unit, the walls of the cavity 114' are preheated to approximately 250° Fahrenheit using the resistant heater 132'. Moreover, the air and steam are removed from the top of the unit. When the microwaves raise the temperature of the food product enough to cause the moisture in the product to boil, the steam will leave the product and fill the cavity 114'. Because the surface temperature of the cavity 114' is above the condensing temperature of the steam, no steam will condense on the surface of the cavity 114'. This unit is particularly suitable for commercial applications in that continuous use of the device will not cause moisture to build up on the walls of the cavity 114'. Moreover, because the walls of the cavity 114' are preheated, the only surfaces which are cool enough to condense the steam which is generated from the product is the cooler surfaces of the food product itself and consequently such device is very effective in cooking a variety of food products and particularly leafy vegetable products.

Accordingly, as can be appreciated from the forgoing discussion with respect to the device illustrated in FIGS. 13–15, the microwave energy generated by the megnatron tube 124, 124' heats the product itself. Consequently with these embodiments it is the temperature of the food product itself which is controlled and not the temperature of a separate heat transfer medium such as steam. This is the case because it is the food product itself which is the heat transfer medium in the embodiments illustrated in FIGS. 13–15 as well as that illustrated in FIG. 16.

While the foregoing embodiments are described in the context of two separate units, an oven may incorporate all the features from both the device illustrated in FIG. 14 as well as that of FIG. 15 as is illustrated by the hidden lines of FIG. 15. Therein, a valve 136' is provided to selectively change the point of removal of the air and steam from the cavity 114' thus the air and steam may be removed from either the bottom or top of the unit and the resistant heater 132' may be selectively operated to heat the walls of cavity 114' only when steam and air are removed from the top of the cavity 114'. In the illustrated embodiment, the valve 136' is preferably a solenoid valve; however any suitable valve may be used. Further, each of the devices illustrated in FIGS. 14 and 15 may be operated in a manner substantially similar to that of existing microwave ovens. That is, the food product may be heated by using time to control the temperature or by using a temperature probe within the food product itself.

Further, in addition to the foregoing, a small amount of water may be provided in a tray 138' at the bottom of the cavity 114 or 114' below the rack 115 or 115' respectively. Thus, more heat can be applied to the product being cooked in that a portion of the microwave energy is dissipated into the product itself while the balance is dissipated into the water which boils and changes into steam with this steam then condensing on the surface of the food product thus adding heat to the food product being cooked. Consequently, the product cooks not only from the microwave energy being dissipated therein but also from the added steam and yet no part of the product can get over the boiling temperature of the moisture in the compartment. In doing so, frozen foods may be thawed or cooked using either of the foregoing devices. Further, rather than placing water within the tray 138', a susceptor material which absorbs microwave energy and becomes hot may be placed in the tray 138'. Thus, when the natural juices of the meat drip down to the susceptor, the high surface temperature of the susceptor will boil the natural juices of the product which subsequently condense on a surface of the food product and adds heat to such product much like using water. However, food products steamed using their natural juices retain more of their natural flavors than food products which are cooked with steam and microwave energy alone.

Figure 16:
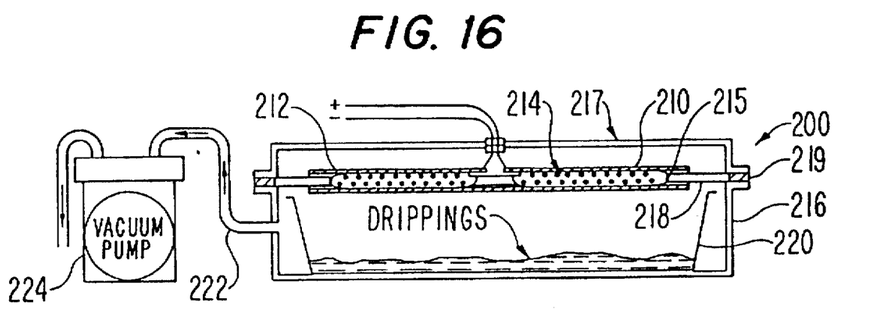
FIG. 16 is a cross-sectional view of yet another cooking device for reduced pressure cooking in accordance with a further embodiment of the present invention.

Referring now to FIG. 16, a further alternative embodiment of the present invention will be described in detail. Again, with the device illustrated in FIG. 16, a device and method of cooking food products such as meats or vegetables that significantly reduce the amount of fat in the cooked product while retaining more natural juices and eliminating carcinogens is disclosed. In this case, electric resistance is used to generate heat to cook the food product retained therein. The device 200 includes two metal sheets or screens 210, 212 and a supporting metal sheet 215 between which the food product 214 is placed. A positive current is connected to the metal sheet 210 while a negative current is connected to the metal sheet 212. The electric current travels through the food product, in this case a hamburger patty and is changed into heat due to the electrical resistance of the water within the food product 214. Consequently, the food product is cooked by the heat generated within the food product itself.

The electrical current travels through the water in the patty and not the meat fiber or the fat. When the electrical current raises the temperature of the water to a boiling point, the water changes to steam and no longer transfers electricity. This reaction causes the hamburger to cook evenly and at the boiling temperature of the water retained within the food product 214. The device 200 includes a housing 216 which receives a holder 218 for retaining the metal plates and food product as well as a drip tray 220 for retaining drippings during the cooking of the food product 214. Communicating with an interior of the housing 216 by way of passage 222 is a vacuum pump 224 for reducing the pressure within the housing 216. As discussed hereinabove, the normal boiling point of water is too high, that is, 212° Fahrenheit is too hot for cooking most food products and in the case of an hamburger would cause the hamburger to be tough and rubbery, the internal pressure of the cooking chamber is thus lowered by way of the vacuum pump 224 to reduce the boiling temperature of the water retained within the food product. This pressure reduction permits the hamburger or other food product to be cooked at a lower temperature, a temperature between 150° and 180° Fahrenheit. The temperature at which the food product within the housing 216 is cooked may be readily controlled by the pressure reduction within the housing 216 which is created by way of vacuum pump 224. In doing so, carcinogens which were previously present during the cooking of the food product are eliminated in that the maximum temperature to which the food product is exposed is approximately 180° Fahrenheit which is not hot enough to form any cancer causing compounds.

With further reference to FIG. 16, a food product such as a hamburger patty 214 is placed on the plate 215 and the lid 217 is closed. The top plates 210 and 212 are connected to the lid and the closing action places these plates in contact with the top surface of the food product 214. Once the lid is closed, the vacuum pump 224 is started to reduce the pressure within the housing 216 and an electric current is supplied to the metal plates. It should be noted that the container is hermetically sealed between the lid 217 and the housing 216 by way of gasket 219. The current thus flows through the top plate 210, down through the food product to the bottom plate 215 and subsequently up through the adjacent food product to the metal plate 212. This operation continues for a predetermined period of time which may be in the range of 30 seconds to 2 minutes and generally approximately 60 seconds. At the end of the cooking cycle, the vacuum is released and the lid is opened, such that the food product can be removed. A valve may be used to release the vacuum or the vacuum may be released simply opening the lid. Drippings from the food product are caught in the tray 220 which is periodically empty.

Figure 17:
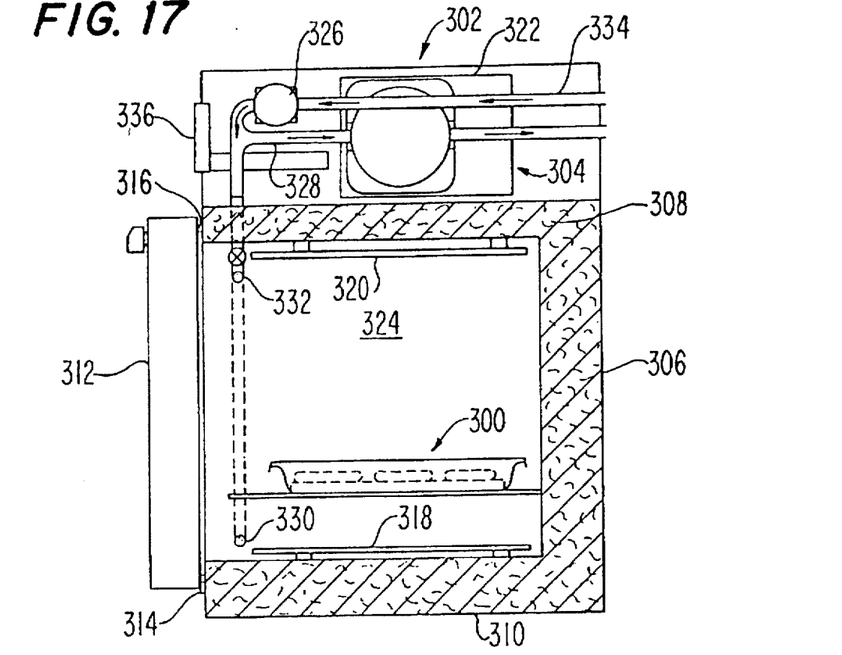
FIG. 17 is a cross-sectional view of a baking oven for cooking food products at a reduced pressure in accordance with an alternative embodiment of the present invention.

FIG. 17 illustrates yet another embodiment of the present invention wherein the food product 300 to be cooked is placed in a baking oven 302 of the radiant or convection type wherein such baking oven 302 includes a system 304 for reducing the internal pressure of the baking oven 302. The baking oven is of the conventional type including insulated side walls 306, an insulated top wall 308, an insulated bottom wall 310 as well as an insulated door 312 which is hingedly connected to the bottom wall 310 by way of hinge 314. The door 312 when closed seals about its perimeter by seal 316. The baking oven may be of either the electric type including electric heating elements 318 and 320 as shown in FIG. 17 or may be heated by way of gas (not shown) or other known source of producing heat energy.

As is noted hereinabove, the baking oven 302 includes the system 304 for reducing the internal pressure of the baking oven 302. This system being similar to that illustrated in FIGS. 14 and 15. The vacuum system includes vacuum pump 322 for evacuating the cooking cavity 324 of the baking oven 302. Also provided is a solenoid valve 326 which when closed permits a vacuum to be drawn within the cavity 324 and when opened selectively subjects the cavity 324 to atmospheric pressure through the solenoid valve 326.

As may be readily apparent from FIG. 17, the vacuum pump 322 includes a vacuum line 328 which extends to a lower region of the cavity 324 and includes inlets 330 and 332. The particular positioning of the inlets 330 and 332 are shown as being in an upper and lower portion of the cavity 324, however a multiple number of outlets or a single outlet may be used with the position of such outlet being determined in accordance with the food product to be cooked within the baking oven 302. Additionally, each of the inlets may include a separate valve for controlling the flow of air through such inlet. The significance of the positioning of the inlets is similar to that set forth hereinabove and shall be explained in greater detail hereinbelow. Additionally, as with the vacuum system illustrated in FIG. 14, the vacuum system 304 includes an atmospheric air passage 334 connected to the solenoid valve 326 for selectively subjecting the cavity 322 to atmospheric pressure. The oven itself as well as the vacuum system may be readily controlled by a control panel 336 which is positioned in an easily accessible portion of the front of the baking oven 302.

Figure 18:
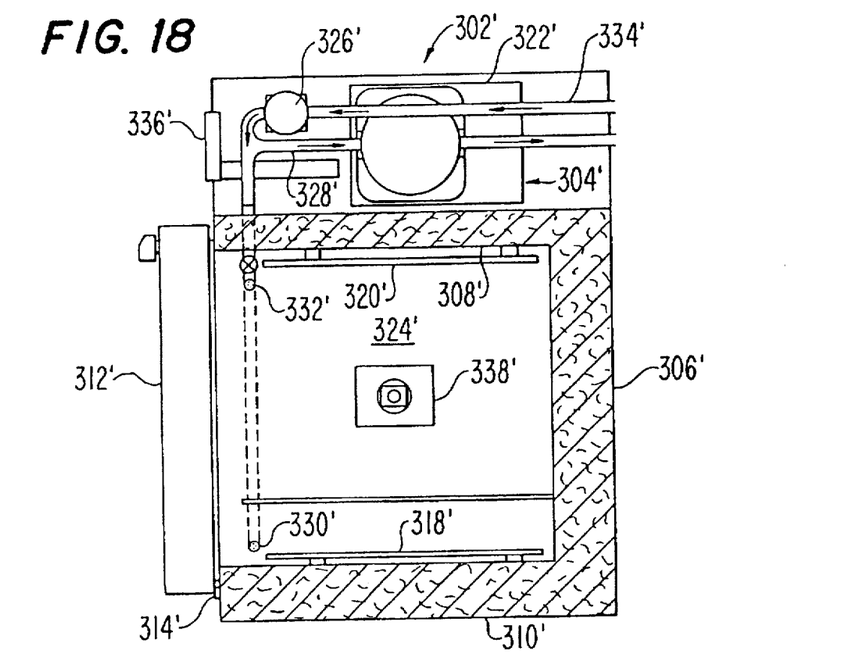
FIG. 18 is a cross-sectional view of a baking oven including a rotisserie for cooking food products at a reduced pressure in accordance with an alternative embodiment of the present invention.

FIG. 18 illustrates an alternative embodiment of the baking oven set forth in FIG. 17. The baking oven includes all of the components of the baking oven 302 with the addition of a rotisserie 338 provided within the cavity 324. The baking oven 302' includes insulated back wall 306' as well as insulated top and bottom walls 308' and 310' respectively. Similarly, an insulated door 312' is provided and hingedly connected to the bottom wall 310' by way of hinge 314'.

The oven 302' likewise includes a vacuum system 304' which includes vacuum pump 322' and vacuum passage 328' for producing a reduced pressure within the cavity 324'. Additionally, the vacuum system 304' includes solenoid valve 326' for selectively subjecting the cavity 324' of the baking oven 302' to atmospheric pressure by way of a passage 334'. As with the previous embodiment, electric heating elements 318' and 320' are provided for heating the cavity 324' of the baking oven 302', however any alternative source of heat energy may be used as discussed hereinabove. Additionally, control panel 336' is provided for controlling the temperature of the cavity 324' as well as the vacuum system 304'.

When a turkey is cooked in a standard oven, portions of the turkey are overcooked while waiting for the remaining portions of the turkey to get up to the necessary temperature. For example, in a conventional baking oven, the breast meat of a turkey will get to 195° F. before the thigh meat gets to the requisite 165° temperature. Breast meat is ideally done at 165° F., thus, by cooking the breast meat to 195° F., the breast meat will dry out and toughen. Consequently, by cooking a turkey in the oven illustrated in FIGS. 17 and 18 with a reduced internal pressure, the breast meat will not get above 165° F. In that the water in the breast will boil and absorb the heat rather than permitting the temperature of the meat to rise. The reduced internal pressure is thus regulated so as to cause the water within the turkey to boil at 165° F. The reduced internal pressure can be regulated to cause the water to boil at any predetermined temperature. However, as discussed hereinabove the ideal temperature for chicken and turkey products is between 165° and 170° F. When the temperature of the meat is raised above 170° F., the fiber in the meat shrinks and causes the juices to be purged out. Far less juice is lost from the meat when boiling and holding the temperature at the reduced level as compared to permitting the temperature to rise.

As discussed hereinabove, the inlets for the vacuum system may be positioned in any position within the cooking cavity 324 however because the water within the meat boils generating steam, which would rise within the oven cavity, it may be desirable to position the inlet in the upper portion of the cavity 324 to draw off this steam which is generated during the cooking of the meat product. However, as discussed hereinabove because the meat product itself is the coldest surface within the oven, by drawing the vacuum from a lower portion of the cavity the steam would be drawn back into contact with the meat product with some of the steam condensing on the product thus providing additional heat transfer medium for heating the food product. The particular positioning of the vacuum system inlet would thus be chosen depending upon the character of the product being cooked.

Similar to the foregoing example, when cooking a pot roast in a standard oven the gravy and other juices boil at 212° F. which for cooking meat and vegetables is too hot thus resulting in the overcooking of the meat and vegetables. Accordingly, by reducing the internal pressure of the cooking cavity 324 of the baking oven 302 to achieve a boiling point of 175° F., the meat and vegetables would not be overcooked and the meat would remain tender. Again, the particular boiling point of the gravy and juices can be controlled by controlling the internal pressure of the cooking cavity 324.

While the foregoing examples are directed to meat products, the oven including a vacuum system is also highly beneficial when cooking fruits and products containing fruits. For example, when baking an apple pie in a conventional oven, the juices boil at 212° F. which rapidly cooks the apples. As discussed hereinabove, most fruits like most meats and vegetables are overcooked at 212° F., thus, reducing the internal pressure of the cavity of the baking oven would permit a cook to select the internal temperature of pies, casseroles, pot roasts and many other dishes so as to retain much of the natural juices of the product while eliminating the creation of harmful carcinogens.

From the foregoing, it is now apparent that a novel cooking technique as well as novel food preparation ovens have been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A baking oven for baking a food product comprising:
   a baking cavity for accommodating the food product;
   a heating means within said baking cavity for raising an internal temperature of said cavity for baking the food product placed therein;
   an evacuation means for selectively reducing an internal pressure of said cavity and for maintaining the moisture content of the food product; and
   restoration means for selectively restoring said cavity to atmospheric pressure;
   wherein said internal pressure of said cavity is selected such that water within the food product boils at a predetermined temperature while the juices of the food product remain within the food product.

2. The oven as defined in claim 1, wherein said restoration means includes a valve means for selectively opening and closing a passage from said cavity to the atmosphere.

3. The oven as defined in claim 1, further comprising a supporting means for supporting the food product within said cavity.

4. The oven as defined in claim 3, wherein said supporting means is a rotisserie for rotating the food product during baking.

5. The oven as defined in claim 1, further comprising an evacuation passage, said evacuation passage communicating said evacuation means with a lower region and an upper region of said cavity, and a valve means for selectively evacuating said cavity from one of said lower region and said upper region of said cavity.

6. A method of cooking a food product by controlling a temperature of the food product containing water during a cooking process comprising:

cooking the food product in a cooking chamber;

controlling a pressure in said chamber as said food product is cooked; and boiling off at least a portion of the water contained in at least a portion of said food product during the cooking of the food product;

wherein the pressure of said cooking chamber is controlled such that the water of said at least a portion of said food product boils to maintain that portion of the food product at a predetermined temperature while permitting remaining portions of said food product to achieve said predetermined temperature.

7. The method as defined in claim 6, wherein said predetermined temperature is in a range of 150° F. to 180° F.

8. The method as defined in claim 7, wherein said predetermined temperature is in a range of 165° F. to 170° F.

9. The method as defined in claim 6, wherein the step of controlling the pressure in said chamber includes reducing the pressure within said chamber.

* * * * *